United States Patent [19]

Pecherer et al.

[11] Patent Number: 5,599,637
[45] Date of Patent: Feb. 4, 1997

[54] PERFORMANCE ZINC ANODE FOR BATTERIES

[75] Inventors: Eugeny Pecherer, Netanya; Joseph Biran, Raanana; Menachem Korall; Jonathan Goldstein, both of Jerusalem, all of Israel

[73] Assignee: Electric Fuel Limited (E.F.L), Jerusalem, Israel

[21] Appl. No.: 541,017

[22] Filed: Oct. 11, 1995

Related U.S. Application Data

[63] Continuation of Ser. No. 277,708, Jul. 20, 1994, abandoned, which is a continuation of Ser. No. 16,019, Feb. 10, 1993, abandoned.

[30] Foreign Application Priority Data

Feb. 10, 1992 [IL] Israel ........................................ 100903

[51] Int. Cl.$^6$ .................................................. H01M 4/02
[52] U.S. Cl. .................. 429/27; 429/17; 429/34; 429/101; 429/229; 429/245; 29/2
[58] Field of Search ..................... 429/245, 101, 429/27, 17, 34, 218, 229; 29/2

[56] References Cited

U.S. PATENT DOCUMENTS

| | | |
|---|---|---|
| 2,561,943 | 7/1951 | Moulton et al. . |
| 3,287,164 | 11/1966 | Arrance . |
| 3,713,891 | 1/1973 | Curelop et al. ........................ 429/230 |
| 3,713,892 | 1/1973 | Moran . |
| 3,926,672 | 12/1975 | Curelop et al. . |
| 4,519,425 | 5/1985 | Seidel ........................................ 141/1.1 |
| 4,842,963 | 6/1989 | Ross, Jr. .................................... 429/21 |
| 5,112,705 | 5/1992 | Hunter et al. ........................... 429/206 |
| 5,360,680 | 11/1994 | Goldman et al. ........................ 429/27 |

FOREIGN PATENT DOCUMENTS

| | | |
|---|---|---|
| 0047792 | 3/1982 | European Pat. Off. . |
| 1492204 | 4/1968 | France . |
| 1573040 | 7/1969 | France . |
| 1930004 | 12/1969 | Germany . |
| 2347273 | 3/1974 | Germany . |
| 2026763 | 2/1980 | United Kingdom . |

OTHER PUBLICATIONS

"On the Use of Third Electrodes in a Secondary Zinc–Air Battery", James J. Postula, Energy Conversion, vol. 10, No. 2, 1970, GB, pp. 45–49.

Primary Examiner—M. Nuzzolillo
Attorney, Agent, or Firm— Helfgott & Karas, P.C.

[57] ABSTRACT

The invention provides a zinc battery anode, comprising a substantially planar skeletal frame including conductive metal and having a portion of its surface area formed as open spaces, and further comprising an active zinc anode component encompassing the skeletal frame, the active anode component being formed of a slurry of porous granules comprising zinc, impregnated with and suspended in an electrolyte, and compacted under pressure to the skeletal frame.

26 Claims, 4 Drawing Sheets

PERFORMANCE ZINC ANODE FOR BATTERIES

This is a continuation of application Ser. No. 08/277,708, filed Jul. 20, 1994, which is a continuation of application Ser. No. 08/016,109, filed Feb. 10, 1993, both abandoned.

FIELD OF THE INVENTION

The present invention relates to electrodes for use in battery cells, particularly zinc-air battery cells of the type used as a power source in electric vehicles, and a method for making the same.

BACKGROUND OF THE INVENTION

Metal-air and particularly zinc-air battery systems are known in the art and due to their high energy densities, relative safety of operation and the possibility of ready mechanical recharging, such systems have been suggested as a power source for electrically propelled automotive vehicles. To date, for various reasons, such systems have yet to meet with significant commercial success.

One of the principle drawbacks of battery systems as a power source for automotive vehicle propulsion, and particularly zinc-air battery systems, resides in the difficulty in achieving the combination of both a high continuous current drain, such as is needed for extended uphill driving, with short term high peak power output such as is needed for quick acceleration, while at the same time maintaining a high energy density and facilitating rapid rechargeability.

On the one hand, in order to achieve high continuous current drain a large reservoir of active anode material is needed. Due to space and other considerations this is generally best achieved by incorporation of a highly porous active anode element having large-surface active anodic material.

By contrast, in order to achieve high peak power output, i.e. the ability to provide a very high level of power for short bursts of time, studies have found that a tight interparticulate structure of the active anodic material is advantageous. This comes at the expense of the porosity of known powdered anodes and can drastically reduce the current capacity of the battery.

To date, in known-in-the art battery systems much emphasis has been placed on achieving high capacity. Zinc anodes in various battery systems are generally formed in one of two broad families of processes: According to one family, particularly applicable to primary alkaline batteries, the anodes are constructed from finely powdered zinc typically produced by a thermal atomization process. The resultant zinc powder typically has a particulate size distribution of between 0.0075 to 0.8 mm and a surface area of between 0.2–0.4 $m^2/gr$; it is generally combined with mercury, sodium carboxymethyl cellulose and KOH solution to form a gelled mass readily extruded into an anode form. Alternatively the powdered zinc may be sintered, or wetted with mercury and pressed into a plate. Porosity of the anode may be controlled by use of removeable pore forming materials such as $NH_4Cl$. The density of the zinc anode material produced by such methods is typically within the range of 2.5–3.5 gr/cc.

According to a second family of processes, exemplified by an anode proposed by Ross, U.S. Pat. No. 4,842,963, claimed to be particularly suitable for electrically rechargeable zinc-air batteries, the electrode is prepared by directly electro-plating metallic zinc from a solution of zinc ions onto a current collector. The electroplating process may be done external to the battery cell, or in secondary battery applications; within the cell itself. The current collector may be in the form of a metallic plate, metallic mesh, metal foam or conductive carbon foam. Alternatively, a zinc electrode is prepared by pasting a mixture of zinc oxide and plastic binder, typically teflon, onto a current collector; the zinc oxide is then electroformed to zinc directly on the current collector within the cell.

At typical current densities appropriate to use in electric vehicles it has been found that zinc-air batteries in which the anodes are constructed according to the above methods fail to provide a combination of rapid rechargeability, high current capacity and high peak power output. Hence it would be desirable to develop an anode capable of providing a battery with all of these attributes, i.e. high current density, rapid rechargeability, high current capacity and high peak power output.

In an effort to further increase the advantages of using zinc-air battery systems for electro-automotive propulsion, it has been further proposed to employ a mechanically rechargeable battery system comprising a rigid anode designed to be rapidly removed and replaced on a periodic basis at service stations specifically equipped for the purpose. The spent anodic material, which after use has been oxidized, may then be recycled external to the battery for later reuse in other batteries. To facilitate recycling of the active anodic material, it is necessary to separate the spent anodic material from the other anode components.

It would therefore also be desirable to provide an anode easily removeable from the battery cell, in which the active anodic material is readily separable from the supporting anode structure so as to facilitate recycling of the anodic material external to the cell.

SUMMARY OF THE INVENTION

Thus, it is a principle object of the invention to provide a zinc anode having improved performance characteristics, particularly suitable for use in mechanically rechargeable zinc-air batteries.

It is a further object of the invention that the anode provide a combination of high energy density, high continuous current capacity and high peak power.

Another object of the invention is that the anode be of such construction to facilitate easy separation of the active anode element from other constructional elements of the anode.

It is yet a still further object of the invention to provide a method for preparation of an anode meeting the aforementioned objects.

With these objects in mind there is now proposed according to the present invention a composite zinc anode, comprising a substantially planar skeletal frame. The skeletal frame comprises conductive metal material and a portion of its surface area is formed as open spaces. An active zinc anode component encompasses the frame. To achieve the combined objects of high continuous current drain and high peak power, the said active anode component is formed of a slurry of porous granules comprising zinc, impregnated with and suspended in an electrolyte. This slurry is compacted under pressure to the frame to form a removeable anode unit.

More particularly, according to one aspect of the invention there is provided a zinc battery anode, comprising a substantially planar skeletal frame including conductive metal and having a portion of its surface area formed as open spaces, and further comprising an active zinc anode component encompassing the skeletal frame, said active anode component being formed of a slurry of porous granules comprising zinc, impregnated with and suspended in an electrolyte, and compacted under pressure to the skeletal frame.

In especially preferred embodiments of the present invention there is provided a rechargeable zinc battery anode, particularly for mechanically rechargeable zinc-air batteries of the type having a housing defining an interior space and containing therein a replaceable metal electrode, said anode comprising a substantially planar skeletal frame including conductive metal and having a portion of its surface area formed as open spaces, and further comprising an active zinc anode component encompassing the skeletal frame, said active anode component being formed of a slurry of porous granules comprising zinc, impregnated with and suspended in an electrolyte, and compacted under pressure to the skeletal frame wherein said zinc anode is configured for removal from said interior space to enable the mechanical replacement thereof.

The porous zinc granules, which may be produced by electro-plating processes, provide for a high energy density and high continuous current capacity. The compacting of the granules under pressure both binds the slurry to itself and to the skeletal frame and establishes the close inter-particulate association necessary to achieve high peak power.

According to another aspect of the invention there is provided a method for producing such an improved anode for a zinc-air battery. The method comprises the steps of (i) forming a skeletal frame from a conductive metal, the frame having some open spaces; (ii) producing a slurry of porous granules comprising zinc, impregnated with and suspended in an electrolyte; (iii) introducing the slurry and the skeletal frame into a slurry compaction device such as for example a die press; (iv) compacting the slurry under pressure to form a rigid plate while allowing excess electrolyte to run-off. According to a second embodiment of this aspect, a skeletal frame consisting of a comb-like series of rigid rods or wires formed of plastic and/or conductive metal is employed. The slurry is compacted into plate form, and the skeletal frame is inserted into the slurry bed before, during or after compacting.

In a further aspect of the present invention there is provided a zinc-air battery cell, adapted for multiple discharge and recharge cycles, comprising a housing defining an interior space for containing therein a replaceable zinc battery anode as defined above in combination with a bifunctional air electrode adapted to constitute a charging electrode adapted upon reversal of current flow to effect the reduction and regeneration of the active zinc in a first mode of operation and wherein said zinc anode is configured for removal from the interior space to enable the mechanical replacement thereof as well as being rechargeable in situ by the application of electric current to said bifunctional air electrode to reduce oxidised active zinc thereof.

Further constructional features and advantages of the invention will become clear in light of the following detailed description of the anode and method for its production.

DETAILED DESCRIPTION OF THE INVENTION

The invention comprises an improved anode particularly suitable for use in a mechanically rechargeable zinc-air battery cell.

Figure 1:
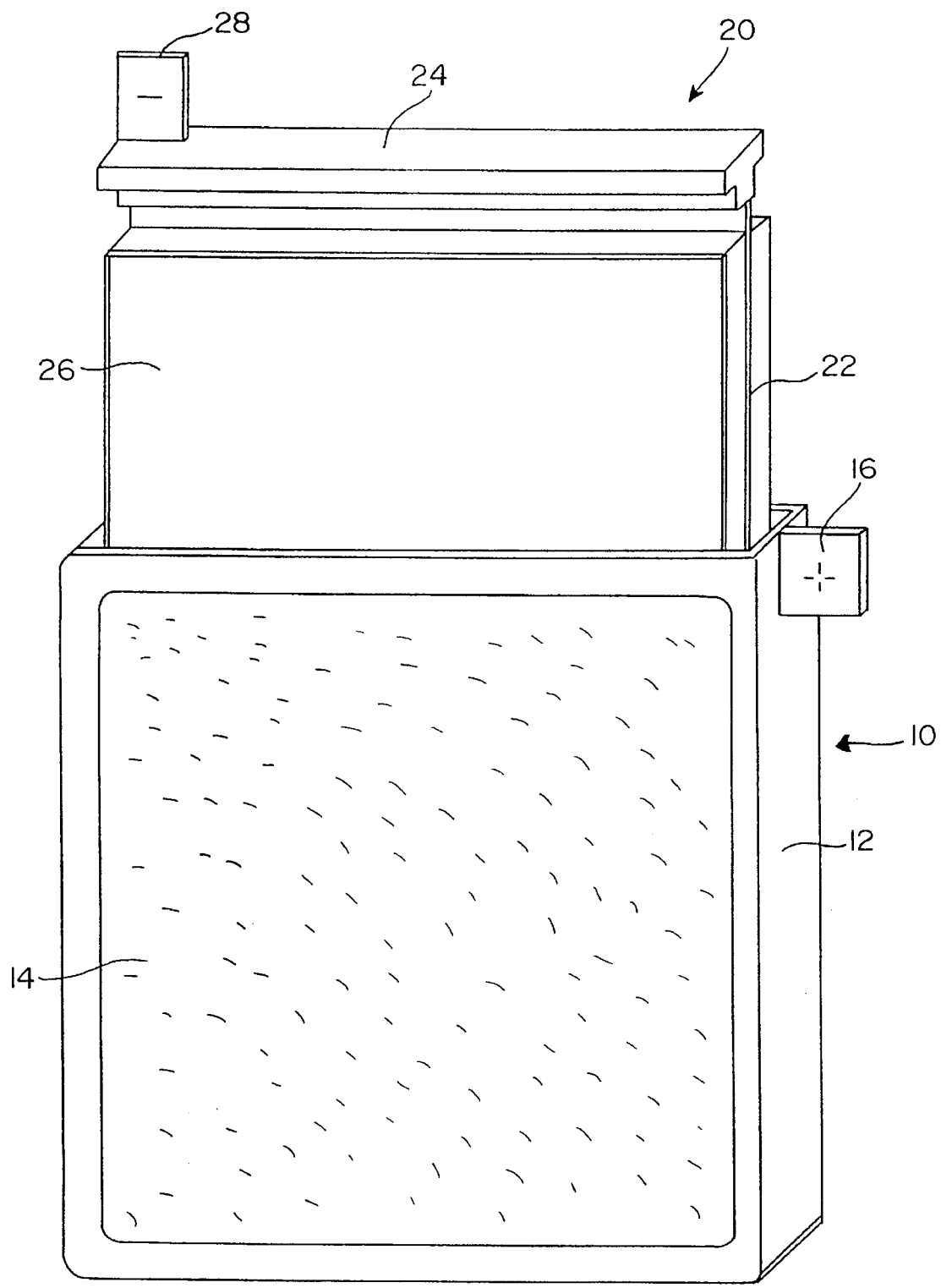
FIG. 1 is a perspective of a typical known monopolar mechanically rechargeable zinc-air battery cell.
Figures 2, 3:
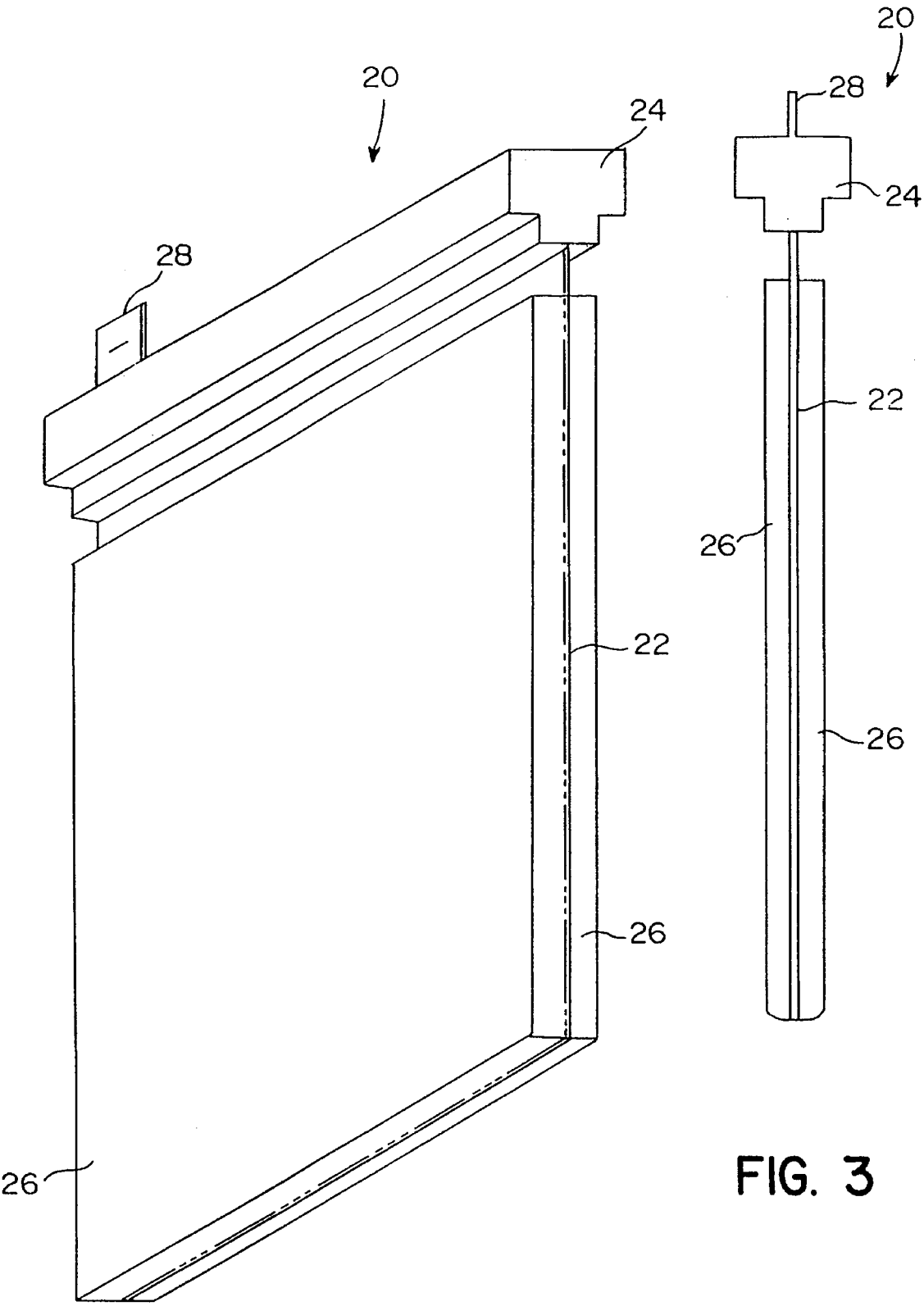
FIG. 2 is a perspective view of the anode contained in the cell of FIG. 1.
FIG. 3 is a side view of the anode of FIG. 2.

Referring to FIG. 1, there is illustrated a typical known-in-the-art mechanically rechargeable monopolar zinc-air battery cell 10, of the type in which the anodes proposed according to the present invention would be particularly suited. The cell 10 generally comprises a housing 12 formed of a corrosion resistant material, suitably polypropylene plastic. Part of the sides of housing 12 are removed. An air cathode 14 having a metallic support screen, an air permeable but liquid impermeable waterproofing layer, and an oxygen reduction catalyst, typically carbon based, is fitted to at least one of the sides of housing 12 to form a liquid tight compartment. A positive electrical contact terminal 16 is provided.

The cell 10 additionally comprises a replaceable planar metal anode, generally denoted 20, comprising a skeletal frame 22, a sealing crown 24, an active zinc anode element 26, and a negative electrical contact 28 as will be described in greater detail below. A set of protective screens (not shown) comprising physical separators and optional ion selective membranes are either fixed in the cell or attached to the sides of the anode to form a removeable cassette unit. Crown 24 is constructed so that upon insertion of anode 20 into housing 10 a liquid tight compartment is formed.

In operation, anode 20 and a suitable electrolyte are positioned in housing 10. When placed under electric load, the electrolyte completes an electric current producing circuit between the air electrode 14 and the zinc anode 20. Once the active zinc is partially or completely expended, anode 20 is readily removed and replaced by a new anode comprising fresh active material.

According to a further aspect of the present invention, the cell 10 is provided with a bifunctional air electrode 14 generally of the description given above with reference to FIG. 1, however incorporating a highly oxidation and corrosion resistant composite catalyst, typically formed of a mixture of transition metal oxides. Such bifunctional air electrodes are known in the art with respect to solely electrically rechargeable battery cell, and therefore need not be further described.

Figure 4:
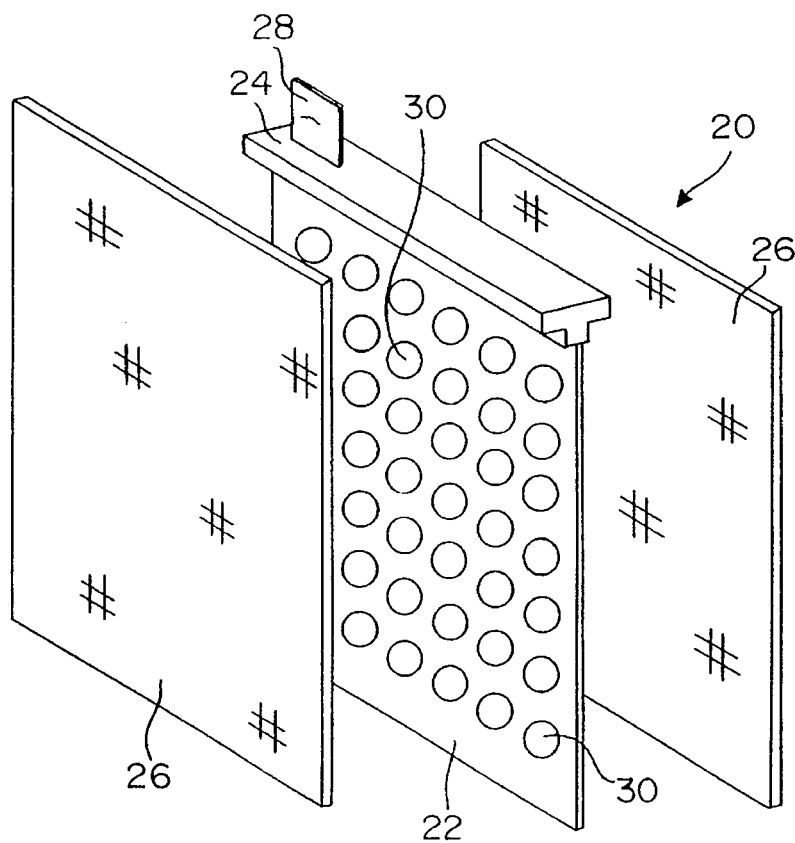
FIG. 4 is an exploded view of the anode of FIG. 2 according to one embodiment of the invention.

As best seen in FIG. 4, the skeletal frame 22 is suitably a generally planar sheet of a conductive metal, for example copper, nickel, titanium, or steel, optionally coated with tin, lead, cadmium, nickel, silver or their alloys, and formed with a plurality of open areas or holes 30. Holes 30 constitute at least 50% of the surface area of the face of the skeletal frame 22. It should be understood that skeletal frame 22 may have various configurations not necessarily limited to a planar sheet, such as those derived from woven filaments, expanded mesh, or a cellular structure such as a honeycomb. The holes 30 may be introduced by any known processes, including punching, cutting, drilling, weaving, welding, soldering, brazing or casting the material from which frame 22 is formed.

Figure 5:
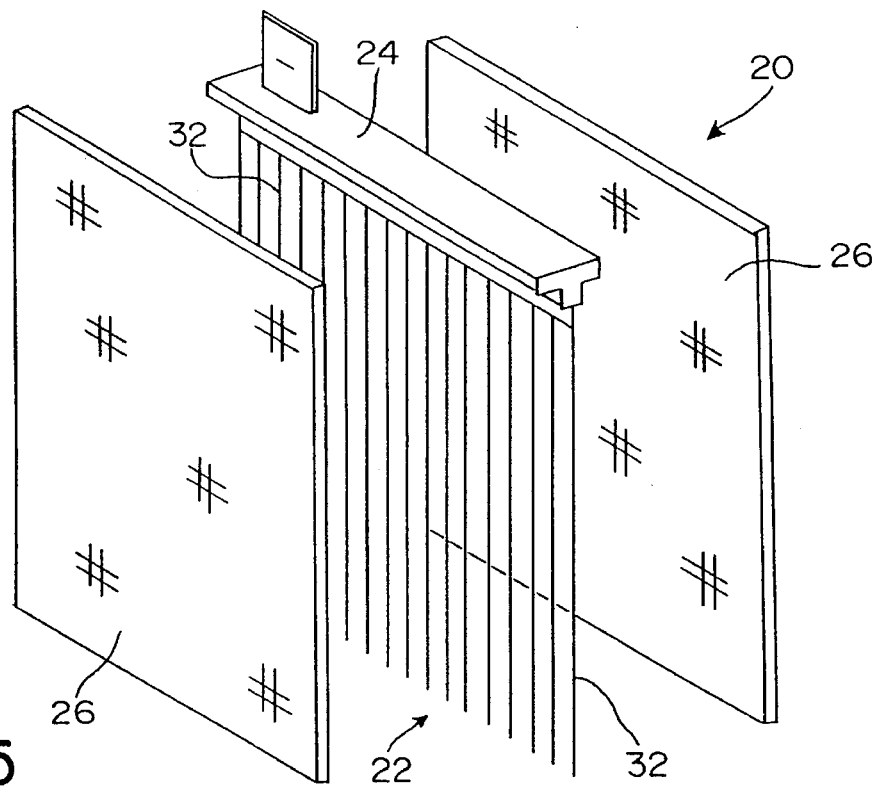
FIG. 5 is an exploded view of a second embodiment of the anode of FIG. 2.

Alternatively, as illustrated in FIG. 5, the skeletal frame 22' may be comprised of a series of rigid rods or wires 32 projecting from the crown 24' as illustrated. The rods or wires 32 may be suitably constructed of any of the conductive metals mentioned above. As a weight saving feature, the rods 32 alternatively may be formed of inert plastics, suitably polypropylene, nylon, fluoropolymers or polyvinylchloride, optionally all or some of which are coated with the said conductive metals. A combination of metal and plastic rods may be incorporated as well.

The active anode element 25 (or 26') is formed from a slurry of porous zinc granules impregnated with and suspended in any suitable electrolyte. The slurry is cold-compacted under pressure at room temperature until adherence of the granules into a rigid static bed of active anode material is achieved. Slurry prepared from porous granules comprising zinc impregnated with and suspended in an electrolyte comprising an aqueous solution of a hydroxide of a group Ia metal, and optionally including inorganic corrosion inhibitors (e.g. PbO, CdO, ZnO, HgO, $In_2O_3$, $Bi_2O_3$, SnO or combinations thereof), organic corrosion inhibitors (e.g. phosphate esters or tetramethyl ammonium hydroxide), gelling agents (e.g. carboxymethyl cellulose), electrolyte extenders (e.g. sodium silicate), fillers (e.g. graphite) and a labelling agent (e.g. cresol red), produced according to the teachings of our copending European Patent Application 91312077 (hereby incorporated by reference), has been found to be particularly suitable. A preferred embodiment of slurry for compaction is formed by homogenizing the slurry in a blender-type machine.

It is this use of a highly porous anodic material compacted to a state of tight interparticulate structure, but still more porous than known-in-the-art zinc anode precursors that provides for the combined attributes of high energy density while at the same time providing high current capacity and high peak power.

Figure 6:
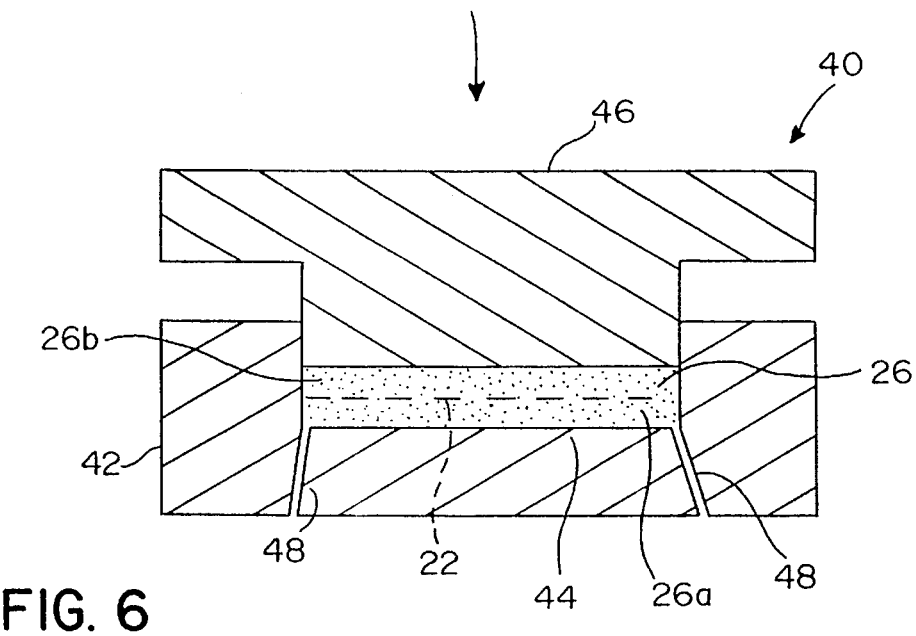
FIG. 6 is a schematic cross section of a die-press used in the production of the anode of FIGS. 4 or 5.

A die-press 40 for compacting the anode 26 (or 26') is illustrated in FIG. 6. The die comprises a lower female member 42, having a recess 44 and a mating upper male member 46. Channels 48 are provided to allow for the run-off of excess electrolyte when the slurry is compacted. It should be understood to those skilled in the art that many forms of slurry compaction device may be used, and the die press illustrated should be considered merely exemplary.

The open spaces provided in the skeletal frame 22, i.e. holes 30 in collector 26 and the gaps between the rods or wires of collector 26', are highly important and serve a three-fold purpose. First, the spaces in the skeletal frame foster the adherence of the slurry bed on both sides of the skeletal frame thus forming a unitary plate. Secondly, at the area proximate to the holes, the slurry bad has greater depth relative to the cathode, thus increasing the current production capabilities of the cell; the more open space the greater the effective depth of the active anode element 26, and therefore a greater theoretical power. Finally, the open spaces facilitate separation of the active anode element 26 therefrom for recycling of the anodic material in anode element 26 for later reuse. The embodiment illustrated in FIG. 5 has been found particularly promising in this respect since the anode bed may be readily pulled off the straight wires 32 forming the skeletal frame 22'.

As understood, production of electricity results in oxidation of the active anodic material in anode element 26 to a less conductive oxide state. However, where a highly porous conductive anode material is employed, for example zinc produced according to our said copending European Patent Application, so long as there remains at least 10% zinc (no greater than 90% oxide) in the active anode element, the reduced surface area of the skeletal frame 22 (or 22') resulting from holes 30, from open spaces between wires 32, or from partial incorporation of non-electrically-conductive wires, has not been found to impair the current producing performance of the cell.

Preparation of anode 20 (or 20') is effected as follows: First the skeletal frame 22 (22') is formed and a slurry of active anodic material 26 is prepared. The granules of a suitable slurry of zinc have an apparent initial density of zinc of between 0.2 and 2.0 gr/cc and an active surface area of zinc between 0.5–6.0 $m^2$/gr and are impregnated with and suspended in electrolyte, suitably comprising aqueous hydroxides of a group Ia metal, e.g. KOH. Optional additives as noted above may be included in the slurry, and prior to pressing the slurry may be homogenized in a blender.

A first layer 26a of slurry of active anodic material 26 is layered into the recess 44 of female die-press member 42. The skeletal frame 22 (22') is placed over the first layer, and thereover a second layer 26b of active anodic material. Alternatively, the slurry may be first layered into recess 44, and skeletal frame 22 (22') then introduced before compacting.

The slurry layers of the active anodic material and skeletal frame are compacted at room temperature under the male member 46, the pressure applied being within the range of 1.0–15.0 kg/$cm^2$, the excess electrolyte being allowed to run off through channels 48. Compacting is effected until the active anode 26 forms a rigid plate, the slurry being adherent to itself and to the skeletal frame 22 and typically having a density in the range of 0.5–3.0 gr/cc.

Figure 7:
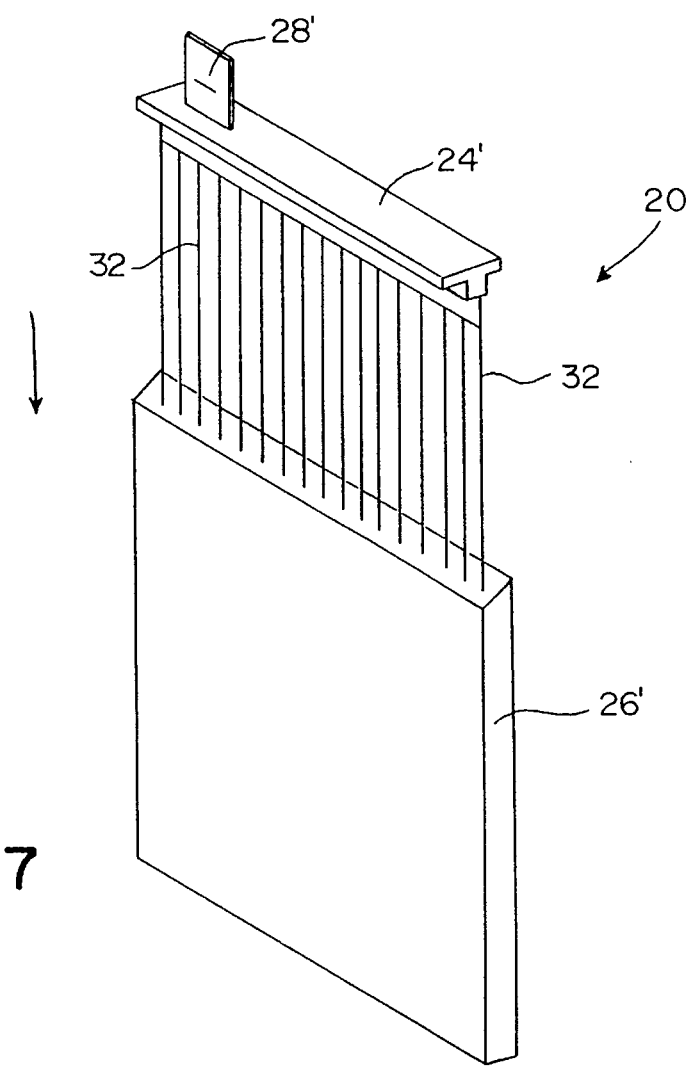
FIG. 7 is a schematic illustration of an alternative method for producing the anode of FIG. 5.

By an alternative method, anode 20' may be constructed as follows: A thick layer of slurry is inserted into recess 44 of female member 42, and the slurry bed is then compacted as noted above until a static bed of slurry 26' is formed. The skeletal frame 22' formed of rods or wires 32 is inserted into the center of the said static bed 26' either prior to, or, as illustrated in FIG. 7, after compacting to form the anode.

From the foregoing description it should be clear that the present invention provides an improved composite anode combining a highly porous anode element for high current capacity while at the same time, as a result of compacting under pressure, an interparticulate structure for high peak power. Although particularly described with respect to an anode for a mechanically rechargeable zinc-air battery cell, it should be appreciated that the anode may be readily adapted for use in zinc-alkaline or other primary battery cell applications as well.

It will further be appreciated by any person skilled in the art that a large range of variations may be introduced without departing from the scope of the invention as defined in and by the appended claims.

What is claimed is:

1. A zinc battery anode comprising a substantially planar skeletal frame including conductive metal and having a portion of a surface area thereof formed as open spaces, and further comprising an active zinc anode component compacted into a compact unitary member of active anode material encompassing the skeletal frame, said active anode component being formed of a slurry consisting of a. zinc granules having an initial density of between 0.2 and 2.0 gr/cc;

b. an electrolyte consisting of an aqueous solution of a hydroxide of a group Ia metal; and optionally including c. a corrosion inhibitor, said zinc granules being impregnated with and suspended in said electrolyte and said slurry being compacted under pressure to itself and to the skeletal frame to form a porous active zinc anode element having a density in the range of 0.5–3.0 gr/cc, said spaces in the skeletal frame fostering the adherence of said compact unitary member of active anode material, from which excess electrolyte has run off during said compaction, on both sides of said skeletal frame, thus forming a unitary plate of active anode material.

2. A rechargeable zinc battery anode, particularly for mechanically rechargeable zinc-air batteries of the type having a housing comprising a base and a pair of planar outer electrode means configured to define therebetween an interior space and containing therein a replaceable metal electrode, said interior space communicating with an opening opposite said base, through which said rechargeable zinc battery anode is selectively removable to allow for a mechanical replacement thereof, said anode comprising a substantially planar skeletal frame including conductive metal and having a portion of a surface area thereof formed as open spaces, and an active zinc anode component compacted into a compact unitary member of active anode material encompassing the skeletal frame, said active anode component being formed of a slurry of granules consisting of zinc having an initial density of between 0.2 and 2.0 gr/cc, and an electrolyte, said zinc being impregnated with and suspended in said electrolyte and compacted under pressure to itself and to the skeletal frame to form a porous active zinc anode element having a density in the range of 0.5–3.0 gr/cc, said electrolyte consisting of an aqueous solution of a hydroxide of a group Ia metal and said spaces in the skeletal frame fostering the adherence of the compact unitary member on both sides of said skeletal frame, thus forming a unitary plate, wherein said zinc anode is configured to allow for mechanical withdrawal of said skeletal frame with compacted zinc slurry as a unit from said interior space via said opening to enable the mechanical replacement of the zinc anode.

3. The anode as claimed in claim 1 wherein the skeletal frame comprises a planar metallic sheet selected from the group of metals consisting of copper, nickel, titanium and steel, said metals being optionally coated with metals selected from the group consisting of lead, tin, cadmium, silver and their alloys.

4. The anode as claimed in claim 3 wherein the open spaces of the skeletal frame amount to 50% or more of the face of the said skeletal frame.

5. The anode as claimed in claim 4 wherein the open areas are obtained by punching, cutting, drilling, weaving, welding, soldering, brazing or casting of the skeletal frame material.

6. The anode as claimed in claim 1 wherein the skeletal frame comprises a series of spaced wires formed into a substantially planar surface.

7. The anode as claimed in claim 6 wherein the wires are formed of materials selected from the group consisting of copper, nickel, titanium, steel, polypropylene, nylon, fluoropolymers and each of said materials being optionally coated with metals selected from the group consisting of lead, tin, cadmium, silver and their alloys.

8. The anode as claimed in claim 7 wherein the open areas between the wires amount to 50% or more of the face of said plate.

9. The anode as claimed in claim 2 wherein the porous granules are produced by an electro-plating process and optionally homogenized in a blender.

10. The anode as claimed in claim 9 wherein the electrolyte comprises aqueous hydroxides of one or more Group Ia metals.

11. The anode as claimed in claim 2 further comprising physical separators and optional ion selective membranes proximate to and covering the active zinc anode element and configured as a removeable cassette.

12. A method for producing an improved mechanically rechargeable zinc battery anode comprising the steps of:

(i) forming from an electrically conductive metal a skeletal frame having some open spaces;

(ii) preparing a slurry of granules consisting of zinc having an initial density of between 0.2 and 2.0 gr/cc, impregnated with and suspended in an electrolyte, said electrolyte consisting of an aqueous solution of a hydroxide of a group Ia metal, and optionally including a corrosion inhibitor;

(iii) introducing the slurry and the skeletal frame into a slurry compaction device; and (iv) compacting the slurry under pressure in the slurry compaction device, so that the compacting of the granules under pressure both binds the slurry to itself and to the skeletal frame to form a porous active zinc anode element in the form of a compact unitary member of active anode material encompassing the skeletal frame while allowing excess electrolyte to run off, said spaces in the skeletal frame fostering the adherence of the compact unitary member on both sides of said skeletal frame, and wherein the active zinc anode element has a density in the range of 0.5–3.0 gr/cc.

13. The method as claimed in claim 12 wherein the skeletal frame is formed of a substantially planar metallic sheet selected from the group of metals consisting of copper, nickel, titanium, and steel, optionally coated with metals selected from the group consisting of lead, tin, cadmium, nickel, silver and their alloys.

14. The method as claimed in claim 13 wherein the skeletal frame plate is formed with removed areas amounting to 50% or more of the face of the plate.

15. The method as claimed in claim 14 wherein the removed areas are obtained by punching, cutting, drilling, weaving, welding, soldering, brazing or casting the skeletal frame material.

16. The method as claimed in claim 12 wherein the skeletal frame is formed into a generally planar and rectangular shape from a series of spaced wires.

17. The method as claimed in claim 15 wherein the wires are formed of material selected from the group consisting of copper, nickel, titanium, steel, polypropylene, nylon and polyvinylchloride, each of said materials being optionally coated with metals selected from the groups consisting of lead, tin, cadmium, silver and their alloys.

18. The method as claimed in claim 17 wherein the skeletal frame is formed with its face having 50% or more open areas.

19. The method as claimed in claim 12 wherein the porous granules are prepared by an electro-plating process.

20. The method as claimed in claim 19 wherein the electrolyte is produced from water and hydroxides of Group Ia metals.

21. The method as claimed in claim 12 wherein the slurry and skeletal frame are layered into the slurry compaction device as follows: a first layer of slurry, then the skeletal frame, then a second layer of slurry.

22. The method as claimed in claim 12 wherein all the slurry is layered into the slurry compaction device and then the skeletal frame is introduced.

23. The method as claimed in claim 21 wherein pressure applied to the slurry is within the range of 1–15 kg/cm$^2$ until the granules adhere to themselves and to the skeletal frame to form a rigid plate, wherein the active anode element has the following characteristics: density in the range of 0.5–3.0 gr/cc.

24. The method as claimed in claim 23 wherein the temperature under which the pressure is applied is within the range 15°–35° C.

25. A zinc-air battery cell, adapted for multiple discharge and recharge cycles, comprising a housing defining an interior space for containing therein a replaceable zinc battery anode as claimed in claim 2 in combination with a bifunctional air electrode adapted to constitute a charging electrode adapted upon reversal of current flow to effect the reduction and regeneration of the active zinc in a first mode of operation and wherein said zinc anode is configured for removal from the interior space to enable the mechanical replacement thereof as well as being rechargeable in situ by the application of electric current to said bifunctional air electrode to reduce oxidised active zinc thereof.

26. A method for producing an improved zinc battery anode comprising the steps of:

(i) forming from an electrically conductive metal a skeletal frame having some open spaces;

(ii) preparing a slurry of granules consisting of zinc having an apparent initial density of between 0.2 and 2.0 gr/cc, impregnated with and suspended in an electrolyte, said electrolyte consisting of an aqueous solution of a hydroxide of a group Ia metal, with optional homogenization in a blender;

(iii) placing the slurry in a slurry compaction device; and (iv) compacting the slurry under pressure in the slurry compaction device so that the compacting of the granules under pressure binds the slurry to itself to form a porous active zinc anode component in the form of a unitary plate while allowing excess electrolyte to run off; and (v) inserting at least part of the skeletal frame into the active zinc anode element, wherein a porous active zinc anode element is formed having a density in the range of 0.5–3.0 gr/cc.

* * * * *